E. T. BOND.
FOLDABLE CRATE.
APPLICATION FILED OCT. 19, 1910.
1,076,623.
Patented Oct. 21, 1913.
2 SHEETS—SHEET 1.
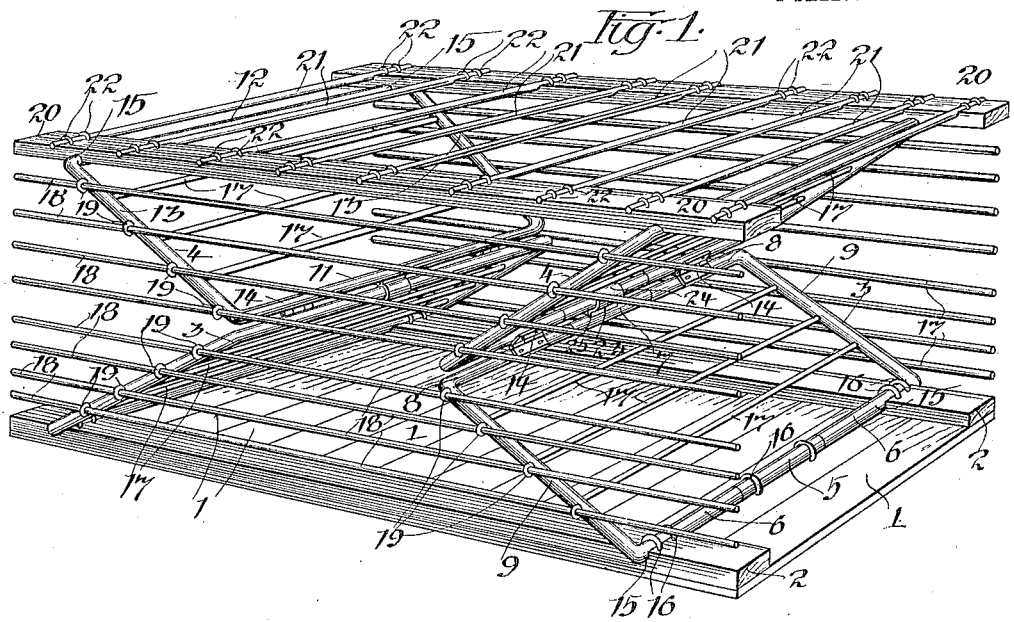
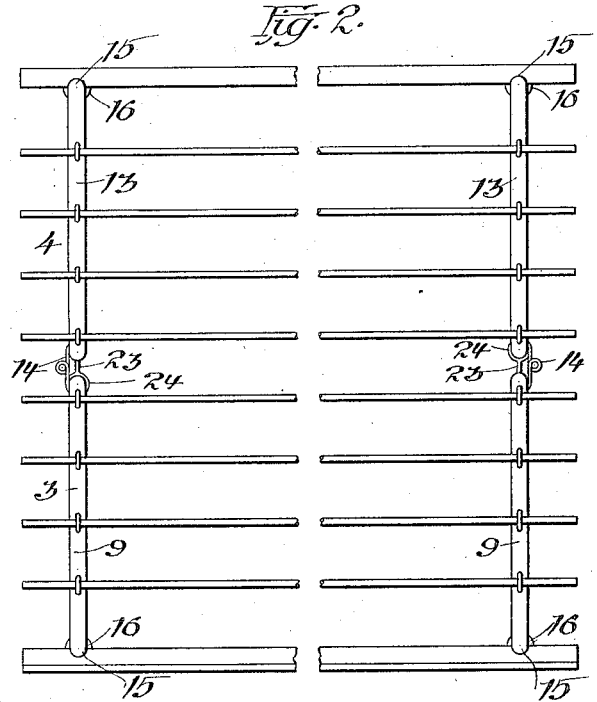
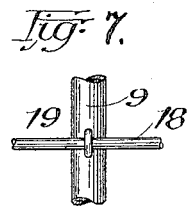
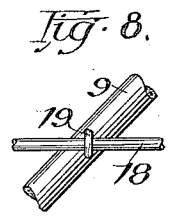

E. T. BOND.
FOLDABLE CRATE.
APPLICATION FILED OCT. 19, 1910.
1,076,623.
Patented Oct. 21, 1913.
2 SHEETS—SHEET 2.
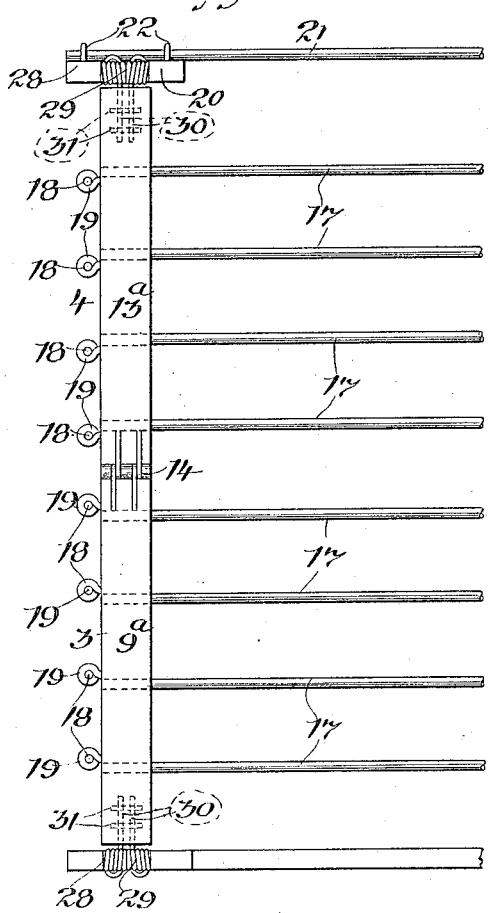
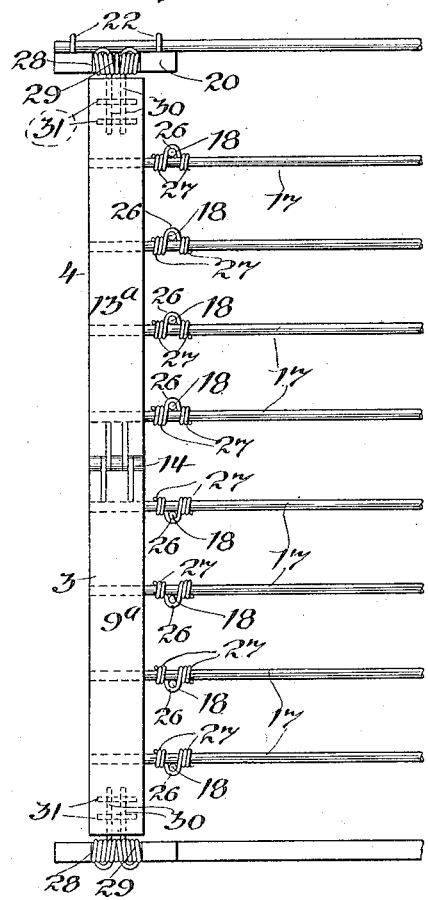
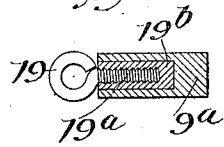
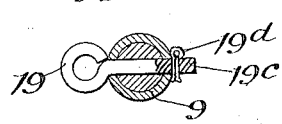

UNITED STATES PATENT OFFICE.

EDGAR T. BOND, OF CHICAGO, ILLINOIS.

FOLDABLE CRATE.

1,076,623.  Specification of Letters Patent.  Patented Oct. 21, 1913.

Original application filed September 10, 1909, Serial No. 517,011. Divided and this application filed October 19, 1910. Serial No. 587,842.

*To all whom it may concern:*

Be it known that I, EDGAR T. BOND, a citizen of the United States, residing at Chicago, in the county of Cook and State of Illinois, have invented certain new and useful Improvements in Foldable Crates, of which the following is a specification, reference being had to the accompanying drawings, forming a part hereof, the same being a division of application Serial No. 517,011, filed September 10, 1909, by me.

This invention relates to foldable crates or receptacles designed more especially for transportation and storage purposes, but which are adapted for use and can be used for other purposes.

The objects of the invention are: to construct a crate or receptacle that will be light and easily handled, and at the same time will be strong and durable in use; to enable the crate or receptacle to be unfolded or set up for use without trouble or inconvenience, and to be quickly and readily folded together so as to occupy but a small space as compared with its unfolded or set-up condition; to form the sides and top of the crate or receptacle of strands or bars made of wire or strips of metal or other material of sufficient rigidity to furnish the necessary strength for the crate or receptacle when unfolded or set up; to form the crate of two sides centrally and inwardly foldable and carrying the bars or strips for all four sides of the crate in its complete form, and to improve generally the construction, arrangement and operation of the several parts entering into the formation of the crate or receptacle as a whole.

The invention consists in the features of construction and combinations of parts hereinafter described and claimed.

In the drawings,—Figure 1 is a perspective view showing the crate or receptacle of the present invention, in which the four sides are formed through the medium of oppositely disposed ends or sides centrally and inwardly foldable and carrying the bars or strips for the four sides; Fig. 2, a detail in elevation, showing the foldable side or end in elevated position; Fig. 3, a detail, being a side elevation showing a construction for a corner post or standard inwardly foldable and showing the cross-bars carried by eyes on the outside of the post or standard; Fig. 4, a similar view to Fig. 3, showing the cross-bars mounted on the longitudinal bars inside of the foldable post or standard; Fig. 5, a detail partly in section, showing a bushing of lead or soft material for the rocking eyes carrying the cross-bars; Fig. 6, a detail, partly in section, showing the rocking eyes carrying the cross-bars, with a smooth stem or shank and held in position by a key; Figs. 7, 8 and 9, details showing the several positions of the rocking eye in folding and unfolding the ends or sides of the crate or receptacle.

In the drawings, similar reference numerals indicate corresponding parts.

The construction shown has a bottom 1, attached to which on the upper side are longitudinal strips 2, on which strips are mounted the foldable ends or sides of the crate or receptacle. The foldable ends or sides each consist of a lower section 3 and an upper section 4, made of tubing or of wire or other suitable material. The lower section 3 has its bottom bar formed of a central section 5 and end sections 6, with a joint between the central section and the end sections to allow of a free rocking movement of the bar in raising and lowering to unfold and fold the crate or receptacle. The upper bar of the lower frame or section of the foldable end or side has a central section 7 and end section 8, with a connection between the central section and the end sections to allow of free and easy movement in raising and lowering the end or side. The lower frame or section of the foldable end or side is completed by corner support sections 9 and, as shown, the corner support sections 9 and the sections 6 and 8 of the bottom and top bars of the frame are made in a single piece, and these parts may be formed of a tube or of a solid piece, and, if desired, a wire or stiffening may be inserted where the parts are formed of the tube. The union or connection between the sections 5 and 6 and the sections 7 and 8 in the form shown is had by means of trunnions, not shown on the sections 5 and 7 at each end, which enter holes in the sections 6 and 8 so as to furnish a free joint on which the frame can turn in raising and lowering without danger of twisting or warping the top and bottom bars out of position.

The upper frame or section of each end or side of the crate or receptacle, in the form shown, consists of a lower bar 11, an upper bar 12, and corner support sections 13, and, as shown, the several bars are formed continuous; but if desired the top and bottom bars could be formed in the same manner as the top and bottom bars of the lower frame or section of the end or side. The upper frame or section can have its bars made of a tube or of a solid material, and if made of a tube a wire or other stiffening can be inserted to give additional rigidity and strength, if so desired. The two frames or sections of the foldable ends or sides are united one to the other, in the arrangement shown, by means of leaf hinges 14, but they could be otherwise united so as to be foldable inwardly in manipulating the crate or receptacle. The bottom bar of the lower frame or section of the foldable end or side is supported in a groove 15, formed in each side strip 2 of the bottom, and is held in place by means of staples 16, so as to be free to turn in raising and lowering the end or side of the crate or receptacle. The upper bar or rail of the top frame or section is also inserted in a groove 15 formed in the top rail of the cover, and is held in place by the staples 16, so that the top bar 12 can rotate in raising and lowering the crate or receptacle.

Each frame or section of the foldable ends or sides has secured in the corner support sections 9 and 13 cross-bars 17, forming the end or side of the crate or receptacle in connection with the frames or sections 3 and 4 of the foldable ends or sides. The remaining sides of the crate or receptacle are completed by means of longitudinal bars 18 mounted in rocking eyes 19 attached to the corner support sections 9 and 13 of the frames or sections of the foldable sides or ends of the crate or receptacle. The rocking eyes are free to turn with their stems, so that in folding and unfolding the crate or receptacle the rocking eyes, carrying the longitudinal bars or strands 18 will rock back and forth and assume the proper position for the folding and unfolding. The position of each rocking eye in folding and unfolding is clearly shown in Figs. 9, 10 and 11, Fig. 9 showing the position when the crate or receptacle is unfolded, Fig. 10 showing the position when the crate or receptacle is partly folded, and Fig. 11 showing the position when the crate or receptacle is fully folded. It will thus be seen that by means of these rocking eyes the crate or receptacle can be unfolded and folded without any trouble, and, in raising and lowering the foldable sides or ends of the crate or receptacle, the eyes 19 will move forward and back, allowing the longitudinal bars or rods 18 to furnish a bearing on which the eyes can slide in and out as required in raising and lowering the foldable ends or sides, and this without disturbing the relation or the attachment of the strands or rods 18 to the ends or sides of the foldable crate or receptacle.

As shown in Fig. 7, each eye 19 has a threaded stem $19^a$ for securing the eye in place, and, in order to prevent wear of the thread in the frame post or standard, the threaded stem of the eye is entered into a bushing or bearing $19^b$, preferably formed of lead, but which can be formed of other soft material that will not be seriously affected in the rocking movement of the eye, and which will reseat itself in case of wear so as to maintain a close bind on the threaded stem of the eye at all times. This bushing or bearing $19^b$, of lead or other soft material, is not only applicable for use in connection with a threaded eye carrying longitudinal strands or rods, but can be used for different purposes and with different devices in which there is a member having a hole or opening to receive another member having a threaded portion, and in which the two members have to be threaded together or unthreaded for any purpose, as, by reason of the capability of the lead to prevent wear in the use of a thread, a bushing or bearing of lead will be of material use and benefit where a threaded member is entered into a companion member for any purpose. Each eye 19 can have a smooth stem $19^c$, which should be of sufficient length to extend through the post or standard, and can be held in position against withdrawal by means of a split key $19^d$, or in any other suitable manner. The eye 19, having a smooth shank or stem $19^c$, will rock back and forth equally as well as the eye having a threaded stem, and in case of wear or breakage the eye can be readily replaced by a new one, it only being necessary to remove the split key and insert a new eye in place of the injured or broken one.

The construction of crate of the present invention furnishes a crate or receptacle which can be easily manipulated in folding and unfolding, and which will furnish a strong and durable construction for use in receiving and carrying various articles.

The crate or receptacle is of exceedingly simple construction, requiring only two ends or sides formed of companion frames or sections hinged or joined together so as to be inwardly foldable, and, as shown, the top of the crate or receptacle consists of two longitudinal bars 20, one on each side, and cross-rods or strands 21 united to the side bars or strips 20 by means of staples 22, or in any other suitable manner. The side bars or strips 20 are mounted on the top rails of the upper frames or sections of the foldable ends or sides of the crate or receptacle, so that in raising and lowering the ends or sides the top of the crate or receptacle will rise and fall with the movement of the foldable ends or sides, maintaining the various parts entering into the formation of the crate or receptacle as a unit in folding and unfolding.

Each foldable end or side, in the construction shown, in addition to the connecting hinges 14 has a locking means for holding the frames or sections in a vertical position when raised. The locking means shown consists of a tongue 23 formed with a socket or thimble 24, which encircles either the upper bar of the lower frame or section or the lower bar of the upper frame or section, and the tongue 23 is arranged to enter a slot 25 formed in the adjacent bar and preferably in the portion of the adjacent bar forming the central section thereof. This tongue and loop or socket connection can be used in place of the hinges, and when used furnishes a lock to assist in holding the two sections or frames of the foldable end or side in vertical position when unfolded; and preferably the tongue is made of some metal which will bend and give and take readily, and thereby allow of the necessary play in the movement of the frame or section in folding and unfolding.

The crate or receptacle, instead of having two opposite sides formed of centrally and inwardly foldable frames, can be made with corner supports in the form of inwardly foldable posts or standards, and such construction is shown in Figs. 3 and 4. Each corner post has a lower member 3 and an upper member 4, corresponding to the two frames or sections of the form shown in Figs. 1 and 2. The two sections 3 and 4 are joined one to the other at their adjacent ends by a suitable hinge 14, and, as shown, the lower end of the divided post or standard and the upper end thereof are respectively attached to the bottom and top of the crate by means of journals 28 and a wire hinge, consisting of a coil 29 with the ends 30 of the wire forming the coil attached to the post or standard by staples 31, or in any other suitable manner, so as to furnish a yieldable connection or attachment for the top and bottom of each divided post or standard to the cover and bottom of the crate or receptacle, which connection is one that will allow of the folding and unfolding of the divided post or standard both at the top and bottom and at the center.

The construction shown in Fig. 3 has longitudinal bars 18 supported in rocking eyes 19, as described for the construction of Figs. 1 and 2.

The construction shown in Fig. 4 has the divided standard or post of Fig. 3, but instead of having the longitudinal rods or bars mounted in rocking eyes such bars are attached inside of the post or standard to the cross-bars 17 by means of loops 26 formed of wire, with the ends 27 of the loops coiled around the cross-bars 17 so as to permit of the necessary sliding movement of the loops on the longitudinal bars 18 in folding and unfolding the crate or receptacle.

The crate or receptacle of the present invention, whether formed with inwardly and centrally foldable frames or sections or inwardly and centrally foldable posts or standards, presents a construction which makes a very strong and durable crate or receptacle, and one which can be readily and easily handled in folding and unfolding, and which, when unfolded, has sufficient rigidity and strength for ordinary use, and which can be folded in very compact form for return shipment or for storing away. The crate requires only two ends or sides, and these ends or sides carry the remaining parts of the crate, including the side and end bars and the top or cover, making a simple construction and, at the same time, furnishing a crate well adapted for transportation purposes and for receiving articles both for shipment and for storing away.

The feature of seating the threaded stems of the rocking eyes in a lead bushing or bearing is applicable to and will be found of great benefit and advantage in many places where screws or bolts and nuts are employed that have to be loosened, tightened or removed, either frequently or occasionally, as the lead furnishes a clasp for the thread that will not wear out quickly, or, if worn to any extent, the wear can be readily taken up by compressing the lead around the thread.

The advantages pertaining to the crate or receptacle of the present invention are apparent, and need not be described in detail. Suffice it to say that the crate can be readily and quickly unfolded and folded, is very strong and durable, and at the same time light and easily handled, and when folded can be stored away and occupy but a small space in a room or other storing place.

It is to be understood that under the word "crate" is included coops for chickens, crates for the transportation of berries, vegetables, or other commodities, receptacles, carrying cases for eggs, folding boxes, cases or crates for the delivery of packages or bundles commonly put up in grocery stores, meat markets and other retail stores in any general merchandise line of business, for commercial use in delivery of packages to customers, patrons and consumers.

The foldable crate or receptacle of the present invention has two opposite sides centrally and inwardly foldable, each side consisting of a rigid support, either in the form of a frame, or of corner posts or standards, made in two parts hinged or otherwise united at the center, and cross-strands; and under the the term "strand" is included a wire, a small sized rod, a strip, a bar, a slat, a twisted strand or other form of connecting means; and the "strand" can be of various shapes, in cross-section, such as round, oval, square, rectangular, triangular, or other shape.

What I claim as new and desire to secure by Letters Patent is:

1. In a folding crate, the combination of four corner supports, one for each corner of the crate, each support centrally divided and jointed at the line of division to fold inwardly and each support also inwardly foldable from its lower end, and four series of strands one series for each side of the crate, each series spaced apart and carried by two of the corner supports, the four series of strands forming with the divided corner supports the four sides of the crate, substantially as described.

2. In a foldable crate, the combination of a bottom, a top, two pair of corner supports, one support of each pair at each corner of the crate, each support centrally divided and jointed at the division line to fold centrally inward and each support also inwardly foldable from its lower end, four series of strands, one series for each side of the crate, two series extending cross-wise between the corner posts, and two series extending longitudinally between the same corner posts as the cross-strands, the four series forming with the four corner posts the four sides of the crate, substantially as described.

3. In a foldable crate, the combination of a bottom, a top, four supports, one support at each corner of the crate, each support centrally divided and jointed at the line of division to fold centrally inward and each support also inwardly foldable at its lower end and adapted to be raised vertically, four series of retaining eyes, one series for each support, each series spaced apart between the upper and lower ends of each support and the eyes of each series arranged in a vertical plane one above the other, two series of strands spaced apart and carried by the corner supports, and two series of strands spaced apart and carried by the retaining eyes, the four series of strands forming with the four corner supports the four sides of the crate, substantially as described.

4. In a foldable crate, the combination of a bottom, a top formed of a rigid frame and cross-strands attached to the frame, two opposite sides, each side centrally and inwardly foldable and each side pivotally mounted on the bottom, each side having at each corner a divided support, a series of eyes for each of the four supports, each series spaced equidistant apart between the ends of the support, two series of strands carried by two companion series of eyes, and two series of cross-strands spaced apart and fixedly carried by each pair of corner supports, the four series of strands forming with the divided corner supports the four sides of the crate, substantially as described.

5. In a foldable crate, the combination of two opposite sides, each side having corner supports and cross-strands carried by the corner supports, each support centrally inwardly foldable and inwardly foldable from its lower end, a series of eyes for each support with the eyes spaced apart between the upper and lower ends of the support, and a series of strands on each side and carried by the eyes, the four series of strands and the corner supports forming the four sides of the crate, substantially as described.

6. In a foldable crate, the combination of two opposite sides, each side having corner supports and cross-strands fixed between the supports, each support centrally inwardly foldable and inwardly foldable from its lower end, a series of rocking eyes mounted on each support with the eyes spaced apart between the upper and lower ends of the support, and a series of strands on each side and carried by the rocking eyes, the four series of strands and the corner supports forming the four sides of the crate, substantially as described.

7. In a foldable crate, the combination of a top, a bottom, two opposite sides centrally inwardly foldable and inwardly foldable from the lower end, and each consisting of divided supports and cross-strands between and fixedly attached to the divided supports, a series of rocking eyes mounted on each support, and spaced apart between the upper and lower ends of the support, and a series of strands on each side and carried by the rocking eyes, the four series of strands and the supports forming the four sides of the crate, substantially as described.

8. In a foldable crate, a rigid support, a series of rocking retaining eyes mounted on the support and spaced apart between the upper and lower ends of the support and adapted to receive and support a series of side strands, and a compressible bushing surrounding each retaining eye for taking up wear and preventing loosening of the eye in the support, substantially as described.

EDGAR T. BOND.

Witnesses:
A. L. PARSONS,
D. T. PARSONS.

---

Copies of this patent may be obtained for five cents each, by addressing the "Commissioner of Patents, Washington, D. C."